United States Patent
Tatara et al.

(10) Patent No.: US 8,182,634 B2
(45) Date of Patent: May 22, 2012

(54) BELT MEMBER PRODUCING METHOD

(75) Inventors: Tetsuo Tatara, Osaka (JP); Tomoyuki Takatsuka, Osaka (JP); Hirokatsu Mizukusa, Osaka (JP); Osamu Fujiki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 334 days.

(21) Appl. No.: 11/995,262

(22) PCT Filed: Jul. 15, 2005

(86) PCT No.: PCT/JP2005/013161
§ 371 (c)(1),
(2), (4) Date: Mar. 19, 2008

(87) PCT Pub. No.: WO2007/010592
PCT Pub. Date: Jan. 25, 2007

(65) Prior Publication Data
US 2010/0071844 A1 Mar. 25, 2010

(51) Int. Cl.
*B29C 65/00* (2006.01)
*B32B 37/00* (2006.01)
*B32B 38/04* (2006.01)
*B29D 30/00* (2006.01)
*B29D 30/08* (2006.01)
*B29D 30/16* (2006.01)
*B60C 9/14* (2006.01)
*B60C 9/16* (2006.01)

(52) U.S. Cl. ..... 156/250; 156/123; 156/124; 156/130.7; 156/133; 156/134; 156/264; 156/304.1; 156/405.1; 156/406.4

(58) Field of Classification Search .......... 156/123–124, 156/130.7, 133, 134, 264, 304.1, 405.1, 406.4
See application file for complete search history.

(56) References Cited

U.S. PATENT DOCUMENTS
5,571,354 A * 11/1996 Miyamoto ...................... 156/64
(Continued)

FOREIGN PATENT DOCUMENTS
EP  1 095 761   5/2001
EP  1 350 616   10/2003
JP  11-99564   4/1999
(Continued)

*Primary Examiner* — Khanh P Nguyen
*Assistant Examiner* — Matthew Hoover
(74) *Attorney, Agent, or Firm* — Fish & Richardson P.C.

(57) ABSTRACT

There is provided a belt member producing method including forming a strip piece 17 of a predetermined width W by cutting a strip material 12 including a plurality of reinforcement cords 11 to a regular size, conveying the strip piece 17 to a transfer conveyor 22 in such a manner that cut sides 19 of the strip piece 17 are in parallel with a traveling direction B of the transfer conveyor 22 and overlapping continuously an integral number $N_{int}$ of strip pieces 17 on each other on the transfer conveyor 22 in such a manner that the strip pieces 17 are overlapped on each other by an overlapping amount P along non-cut sides 18 thereof, so as to produce a belt member 30 having a desired length equal to a predetermined length L of a belt layer of a pneumatic radial tire, the belt member producing method being characterized by including selecting a desired cutting angle $\theta_{pre}$ relative to a traveling direction A of the strip material 17 when the strip material 12 is cut to the regular size, calculating a number $N_{cal}$ of strip pieces 17 necessary for forming a belt member 30 by the following equation (1), rounding up the number $N_{cal}$ so calculated to the integral number $N_{int}$ and calculating an overlapping amount P of the strip pieces 17 by the following equation (2), so as to determine the integral number $N_{int}$ and the overlapping amount P.

$$N_{cal} = (L/W) \times \sin\theta_{pre} \quad (1)$$

$$P = W - L \times \sin\theta_{pre}/N_{int} \quad (2)$$

1 Claim, 3 Drawing Sheets

U.S. PATENT DOCUMENTS

| | | | |
|---|---|---|---|
| 6,280,556 B1 * | 8/2001 | Okada et al. | 156/264 |
| 6,613,177 B1 * | 9/2003 | Suda et al. | 156/264 |
| 7,524,398 B2 * | 4/2009 | Downing et al. | 156/405.1 |
| 2002/0062908 A1 * | 5/2002 | Mancini et al. | 156/130 |
| 2003/0051794 A1 | 3/2003 | Suda et al. | |
| 2006/0113026 A1 * | 6/2006 | Suda | 156/124 |
| 2006/0124227 A1 * | 6/2006 | Suda | 156/134 |

FOREIGN PATENT DOCUMENTS

| | | |
|---|---|---|
| JP | 2001-121622 | 5/2001 |
| JP | 2003-251711 | 9/2003 |
| JP | 2004-122727 | 4/2004 |
| JP | 2005-186732 | 7/2005 |
| WO | WO 02/055289 | 7/2002 |
| WO | WO 2005/063506 | 7/2005 |

* cited by examiner

BELT MEMBER PRODUCING METHOD

TECHNICAL FIELD

The present invention relates to a belt molding method for molding a belt layer for a tire by the use of narrow strip members.

BACKGROUND ART

Conventionally, for belt layers of a pneumatic radial tire, a wide strip member in which a number of aligned reinforcement cords are embedded in an unvulcanized rubber is cut obliquely at a predetermined angle to a belt width, rectangular strip pieces which have been cut obliquely are joined together in such a manner that cut sides thereof constitute both left and right edge portions so as to form a long belt member, and the long belt member is coiled into a roll so as to be stocked temporarily.

This belt member is uncoiled from the roll when molding a belt layer for a tire and is cut along the direction in which the reinforcement cords are aligned to a length which corresponds to a circumferential length of a belt layer, so as to obtain a belt member of a predetermined length.

However, in belt members for one tire, since a width and length thereof differ according to tire sizes and a cord angle thereof differs according to tire specifications, belt members molded in the way described above need to be stocked as belt materials which differ in dimension according to specifications. Consequently, since an extremely large number of types of belt members are prepared as intermediate members, wide stock spaces and intermediate stocks need to be possessed, and it has been difficult to cope with a production of a wide variety of types of products in small lot sizes.

Then, in producing a belt member by joining together a plurality of strip pieces obtained by cutting a strip member of a constant width to a regular size in such a state that non-cut surfaces of the strip pieces so cut are brought into abutment with each other, a method is disclosed for producing a belt member of a desired width and length by adjusting the length of strip pieces to be obtained by cutting in such a manner that the number of strip pieces to be joined together becomes an integer and adjusting a cutting angle of the strip pieces (for example, Patent Document 1).

In the producing method, however, there is caused a problem that in order to obtain a belt member of a desired width and length, the cutting angle of the strip pieces which corresponds to the cord angle needs to be adjusted and a desired cutting angle which is determined from a tire performance required has to be changed.

[Patent Document 1] JP-A-11-99564

DISCLOSURE OF THE INVENTION

Problem that the Invention is to Solve

The invention has been made in view of the problem described above and an object thereof is to provide a belt member producing method which can not only efficiently perform a production of a wide variety of types of products in small lot sizes and but also obtain belt members of a desired width and length without changing the cutting angle which is determined by the performance of a tire.

Means for Solving the Problem

A belt member producing method according to the invention is a belt member producing method including forming a strip piece of a predetermined width W by cutting a strip material including a plurality of reinforcement cords to a regular size, conveying the strip piece to a transfer conveyor in such a manner that cut sides of the strip piece are in parallel with a traveling direction of the transfer conveyor and overlapping continuously an integral number $N_{int}$ of strip pieces on each other on the transfer conveyor in such a manner that the strip pieces are overlapped on each other by an overlapping amount P along non-cut sides thereof, so as to produce a belt member having a desired length equal to a predetermined length L of a belt layer of a pneumatic radial tire, the belt member producing method being characterized by including selecting a desired cutting angle $\theta_{pre}$ relative to a traveling direction of the strip material when the strip material is cut to the regular size, calculating a number $N_{cal}$ of strip pieces necessary for forming a belt member by the following equation (1), rounding up the number $N_{cal}$ so calculated to the integral number $N_{int}$, and calculating an overlapping amount P of the strip pieces by the following equation (2) so as to determined the integral number $N_{int}$ and the overlapping amount P.

$$N_{cal}=(L/W)\times\sin\theta_{pre} \quad (1)$$

$$P=W-L\times\sin\theta_{pre}/N_{int} \quad (2)$$

In the producing method of the invention, a belt member of a predetermined width and length can be formed from one type of strip material without changing the desired cutting angle by changing the length, joining number and overlapping amount of strip pieces by overlapping the strip pieces obtained by cutting the strip material including the plurality of reinforcement cords to the regular size on each other by the predetermined overlapping amount P along the non-cut sides thereof. Due to this, the belt member which can cope with a wide variety of types of tires which differ in tire size and cord angle can be formed without stocking a wide variety of types of intermediate members.

Advantage of the Invention

Thus, according to the invention, since a belt member having an arbitrary length and width can be obtained from one type of strip material without changing a desired cutting angle, a production of a wide variety of types of products in small lot sizes can be implemented with good efficiency while maintaining a cutting angle which is determined by the performance of a tire.

BEST MODE FOR CARRYING OUT THE INVENTION

Hereinafter, an embodiment of the invention will be described in detail based on the drawings.

FIG. 1 is a schematic plan view of a belt member producing apparatus 10 for carrying out a belt member producing method according to an embodiment of the invention, FIG. 2 is a schematic plan view showing a state in which a strip piece 17 is conveyed to a transfer conveyor 16, and FIG. 3 is a plan view showing a belt member 30 which is produced by the same producing method.

As is shown in FIG. 1, the belt member producing apparatus 10 includes a strip roll 14 in which a long belt-shaped strip material 12 which is calendar treated in such a manner that a plurality of reinforcement cords 11 such as aligned steel cords are embedded in an unvulcanized rubber is coiled into a roll shape, a regular-length feeding conveyor 16 for intermittently transferring the strip material 12 which is continuously uncoiled from the strip roll 14, a cutter 20 for cutting the strip material 12 to a regular size into a strip piece 17 on the regular-length feeding conveyor 16, a transfer conveyor 22 on to which the strip piece 17 which has been cut to the regular size is conveyed from the regular-length feeding conveyor 16 and a conveying device 24 for conveying the strip piece 17 which is cut by the cutter 20 to the transfer conveyor 22.

A motor, not shown, is connected to the strip roll 14, so as to send out the strip material 12 to the regular-length feeding conveyor 16 via a festoon 15. The festoon 15 is placed to absorb a difference in speed between a speed at which the strip material 12 is continuously sent out from the strip roll 14 and a feeding speed of the regular-length feeding conveyor 16 at which the strip material 12 is fed intermittently thereon.

The regular-length feeding conveyor 16 can adjust a transfer length along which the strip material 12 is transferred intermittently and is adapted to transfer the strip material 12 a constant length each time in an intermittent fashion. A cutter 20, which can be adjusted with respect to a cutting angle relative to a traveling direction A of the strip material 12, is provided on the regular-length feeding conveyor 16, so as to cut the strip material 12 which is transferred the constant length each time by the regular-length feeding conveyor 16 at a predetermined cutting angle θ relative to the traveling angle A of the strip material 12 to form strip pieces 17, which are to be stocked temporarily.

The transfer conveyor 22 is a conveyor where the strip pieces 17 which are stocked on the regular-length feeding conveyor 16 are conveyed therefrom and are joined together in such a state that the strip pieces 17 are overlapped on each other by a predetermined overlapping amount along non-cut sides 18 thereof, so as to mold a belt member 30 and is disposed in such a manner that a feeding direction B of the transfer conveyor 22 becomes parallel to the traveling direction A of the strip material 12. Note that although illustration thereof is omitted, a presser device is equipped on the transfer conveyor 22 for pressing overlapped portions 21 of the strip pieces 17.

The conveying device 24 includes a gripping means 26 for gripping a strip piece 17 which is cut to a regular size, a supporting means, not shown, for moving vertically and supporting rotatably the gripping means 26 round a rotational center C, and a conveying means 28 for conveying the griping means 26 between the regular-length feeding conveyor 16 and the transfer conveyor 22 and is configured such that a strip piece 17 stocked on the regular-length feeding conveyor 16 is gripped and conveyed on to the transfer conveyor 22 while being rotated through an arbitrary angle round the rotational center C by the gripping means 26. In addition, the gripping means 26 may be such as to grip the strip piece 17 by means of vacuum suction or, in the event that reinforcement cords 11 within the strip piece 17 are made up of a magnetic material such as steel cords, may be such as to grip the strip piece 17 by means of magnetic attraction with the steel cords.

In producing a belt member 30 using the belt member producing apparatus 10, firstly, the strip material 12 having a width dimension W which is coiled into the strip roll 14 is fed to the festoon 15 to stay there temporarily and is then transferred by a predetermined length M which corresponds to a predetermined belt width of a belt layer for a pneumatic radial tire from a cutting position of the cutter 20 to a downstream side of the traveling direction A of the strip material 12 by the regular-length feeding conveyor 16. The strip material 12 that has been so transferred is cut to a regular size at a cutting angle θ by the cutter 20, to thereby form a parallelogram-shaped strip piece 17 having a width dimension equal to the width dimension W of the strip material 12 and having non-cut sides 18 which each have a length M in the traveling direction A of the strip material 12, and the strip piece 17 so formed is then stocked temporarily on the regular-length feeding conveyor 16. As this occurs, the regular-length feeding conveyor 16 temporarily stops without performing any feeding operation.

Here, the cutting angle θ of strip pieces 17 is set to a desired cutting angle $\theta_{pre}$ (for example, $\theta_{pre}$=23°) which is determined from a tire performance which is required for a tire on which the belt member 30 is used, and the length M of the non-cut side 18 of the strip piece 17 is set by an equation, M=S/sin $\theta_{pre}$, letting a belt width of the belt layer be S.

Next, the strip piece 17 so stocked is rotated in such a manner that cut sides 19 of the strip piece 17 become parallel to the feeding direction B of the transfer conveyor 22 and is then conveyed on to the transfer conveyor 22 by the conveying device 24.

Describing in detail, the gripping means 26 of the conveying device 24 stops in an upper position where the center D of the strip piece 17 which is stocked on the regular-length feeding conveyor 16 coincides with the rotational center C of the supporting means, then descends to grip the strip piece 17 on the regular-length feeding conveyor 16 and ascends in this state to move to an upper position above the transfer conveyor 22. As this occurs, as is shown in FIG. 2, a strip piece 17a, which is in the middle of conveyance, is rotated through a predetermined angle (in this embodiment, an angle equal to the cutting angle $\theta_{pre}$) round the rotational center C by the supporting means in such a manner that the cut sides 19 become parallel to the feeding direction B of the transfer conveyor 22 as is indicated by a broken line 17b in FIG. 2 and is moved to be stopped in the upper position above the transfer conveyor 22 while the state resulting after the rotation is held, whereupon the gripping means 26 descends and releases the gripping on the strip piece 17, whereby the strip piece 17 is conveyed on to the transfer conveyor 22. The strip piece 17, which has been so conveyed on to the transfer conveyor 22, is then transferred on the transfer conveyor 22 in the feeding direction B thereof in such a manner that an edge portion of the non-cut side 18 arrives at a predetermined affixing position.

In addition, on the regular-length feeding conveyor 16 where no strip piece 17 is being stocked as a result of the strip piece 17 having been conveyed on to the transfer conveyor 22, the strip material 12 which has been uncoiled from the strip roll 14 and is staying on the festoon 15 is transferred by a predetermined length M so as to be cut to the regular size at the cutting angle $\theta_{pre}$ by the cutter 20, whereby a strip piece which is formed in to the shape described above is temporarily stocked on the regular-length feeding conveyor 16 for preparation for the next conveyance.

Next, the strip piece 17 which is stocked on the regular-length feeding conveyor 16 is conveyed on to the transfer conveyor 22 by the conveying device 24. As this occurs, the strip piece 17 is conveyed in such a manner that the strip piece 17 is overlapped on the strip piece 17 that has already been conveyed on to the transfer conveyor 22 along one of the non-cut sides 18 of the latter strip piece 17 by a predetermined overlapping amount P, and an overlapped portion 21 is pressed by the presser device so as to join them together.

Then, the transfer conveyor 22 transfers the joined strip piece 17 in such a manner that an edge portion of the other non-cut side 18 of the strip piece 17 arrives at the predetermined affixing position.

Thereafter, by repeatedly performing the conveyance of a strip piece 17 stocked on the regular-length feeding conveyor 16 by the conveying device 24, joining the strip piece 17 to the strip piece 17 that has already been conveyed by the presser device, transfer of the joined strip piece 17 by the transfer conveyor 22 and stocking a strip piece 17 on the regular-length feeding conveyor 16 where no strip piece 17 is being stocked as a result of the strip piece 17 having been conveyed, a belt member 30 is molded on the transfer conveyor 22 which is made up of a predetermined integral number $N_{int}$ of strip pieces 17 which are joined together in such a state that the strip pieces 17 are overlapped on each other along their non-cut sides 18 by the predetermined overlapping amount P and which has a desired length equal to a predetermined length L of a belt layer.

Here, the integral number $N_{int}$ of strip pieces and the overlapping amount P which are necessary to form the belt member 30 of the predetermined length L by the strip pieces 17 which are cut at the desired cutting angle % pre are determined by the following procedure.

Firstly, a number $N_{cai}$ of strip pieces 17 necessary to form the belt member 30 is calculated by an equation, $N_{cai}=(L/W) \sin \theta_{pre}$, based on the desired length L of the belt member 30, the width dimension W of the strip piece 17 and the desired cutting angle $\theta_{pre}$ of the strip piece 17, and the number $N_{cal}$ so calculated is rounded up to obtain an integral number $N_{int}$ of strip pieces necessary to form the belt member 30. Following this, an overlapping mount P is calculated by an equation, $P=W-L\times\sin \theta_{pre}/N_{int}$, based on the integral number $N_{int}$ so obtained, the desired length L of the belt member 30, the width dimension W of the strip piece 17 and the desired cutting angle $\theta_{pre}$ of the strip piece 17.

For example, letting the length L of the belt member 30 be 600 πmm, the width dimension W of the strip piece 17 be 29 mm, and the desired cutting angle $\theta_{pre}$ of the strip piece 17 be 23°, the number $N_{cai}$ of strip pieces 17 necessary to form the belt member 30 becomes 25.40, and an integral number $N_{int}$ of strip pieces 17 that is obtained by rounding up the $N_{cai}$ becomes 26, and the overlapping amount P becomes 0.67 mm. Furthermore, examples are shown on Table 1 below in which the length L of the belt member 30 and the desired cutting angle $\theta_{pre}$ are changed.

TABLE 1

| Length/Width of Belt Member (mm) | $\theta_{pre}$ (°) | Ncal (pieces) | Nint (pieces) | P (mm) |
|---|---|---|---|---|
| 600 π/29 | 23 | 25.40 | 26 | 0.67 |
|  | 25 | 27.47 | 28 | 0.55 |
|  | 27 | 29.51 | 30 | 0.47 |
| 650 π/29 | 23 | 27.51 | 28 | 0.50 |
|  | 25 | 29.76 | 30 | 0.23 |
|  | 27 | 31.97 | 32 | 0.03 |
| 700 π/29 | 23 | 29.63 | 30 | 0.36 |
|  | 25 | 32.05 | 33 | 0.84 |
|  | 27 | 34.43 | 35 | 0.47 |
| 750 π/29 | 23 | 31.75 | 32 | 0.23 |
|  | 25 | 34.34 | 35 | 0.55 |
|  | 27 | 36.89 | 37 | 0.09 |
| 800 π/29 | 23 | 33.86 | 34 | 0.12 |
|  | 25 | 36.63 | 37 | 0.29 |
|  | 27 | 39.34 | 40 | 0.47 |

Thus, according to the invention, by setting, respectively, the length M of the strip piece 17 and the integral number $N_{int}$ of strip pieces 17 necessary to form the belt member 30 and the overlapping amount P by the equations described above, the belt member 30 having the desired size (length and width) and cord angle can be produced from the one type of strip material 12. According to the invention, the necessity can be obviated of preparing a wide variety of types of intermediate materials to thereby cope with a production of a wide variety of types of products in small lot sizes with good efficiency, and hence, an arbitrary belt member 30 can be produced without sacrificing a tire performance which depends upon a cord angle.

DESCRIPTION OF THE REFERENCE NUMERALS AND SIGNS

Figure 1:
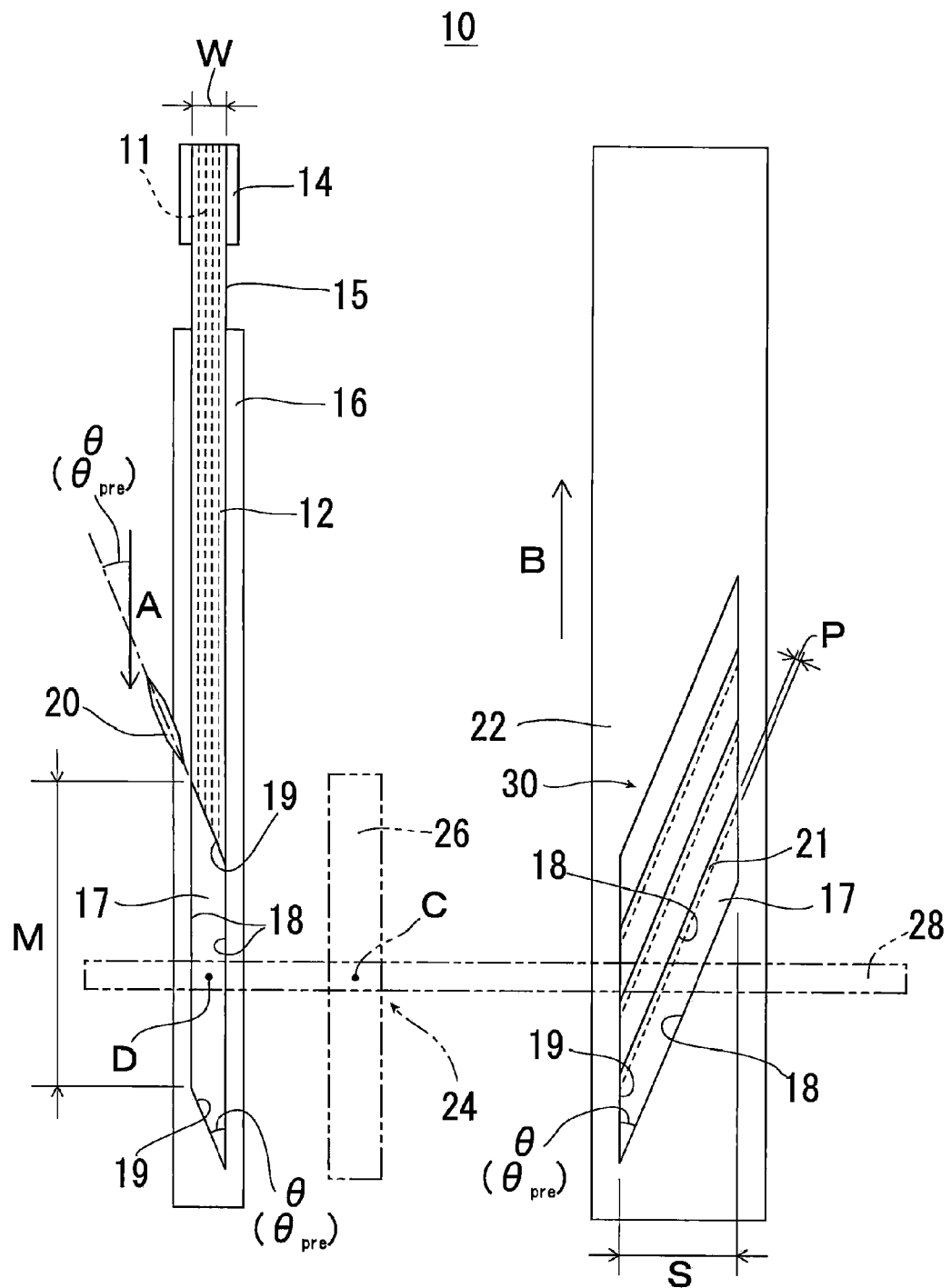
FIG. 1 A schematic plan view of a belt member producing apparatus used to put a belt member producing method according to an embodiment of the invention into practice.
Figure 2:
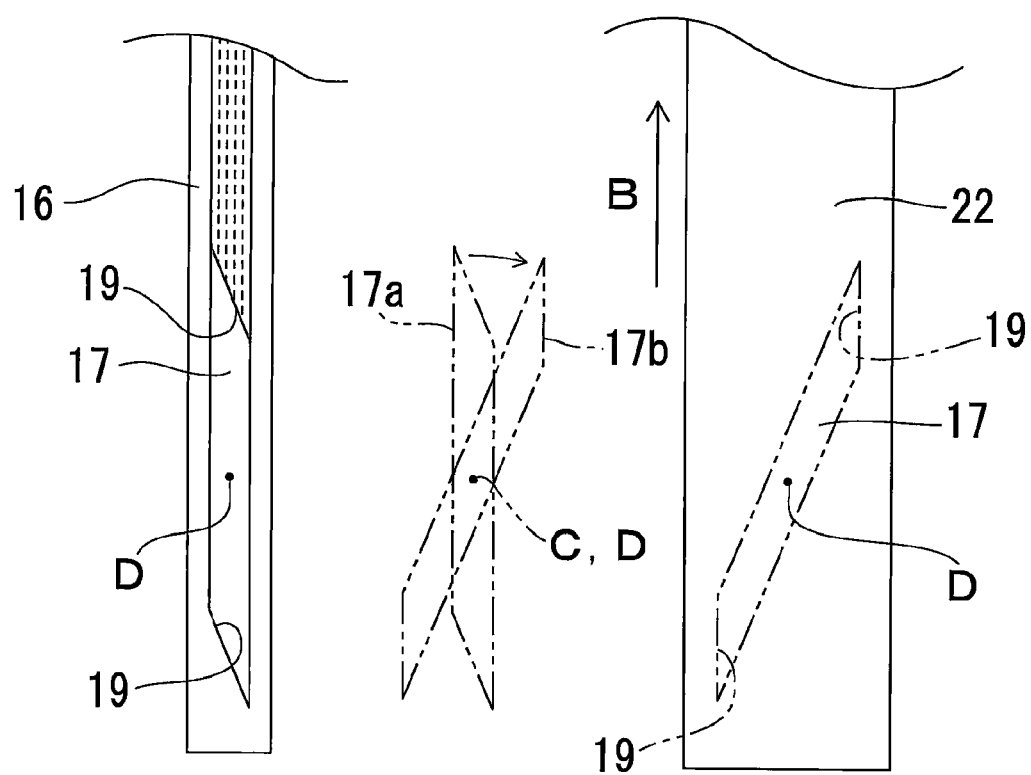
FIG. 2 A schematic plan view showing a state in which a strip piece is being conveyed.
Figure 3:
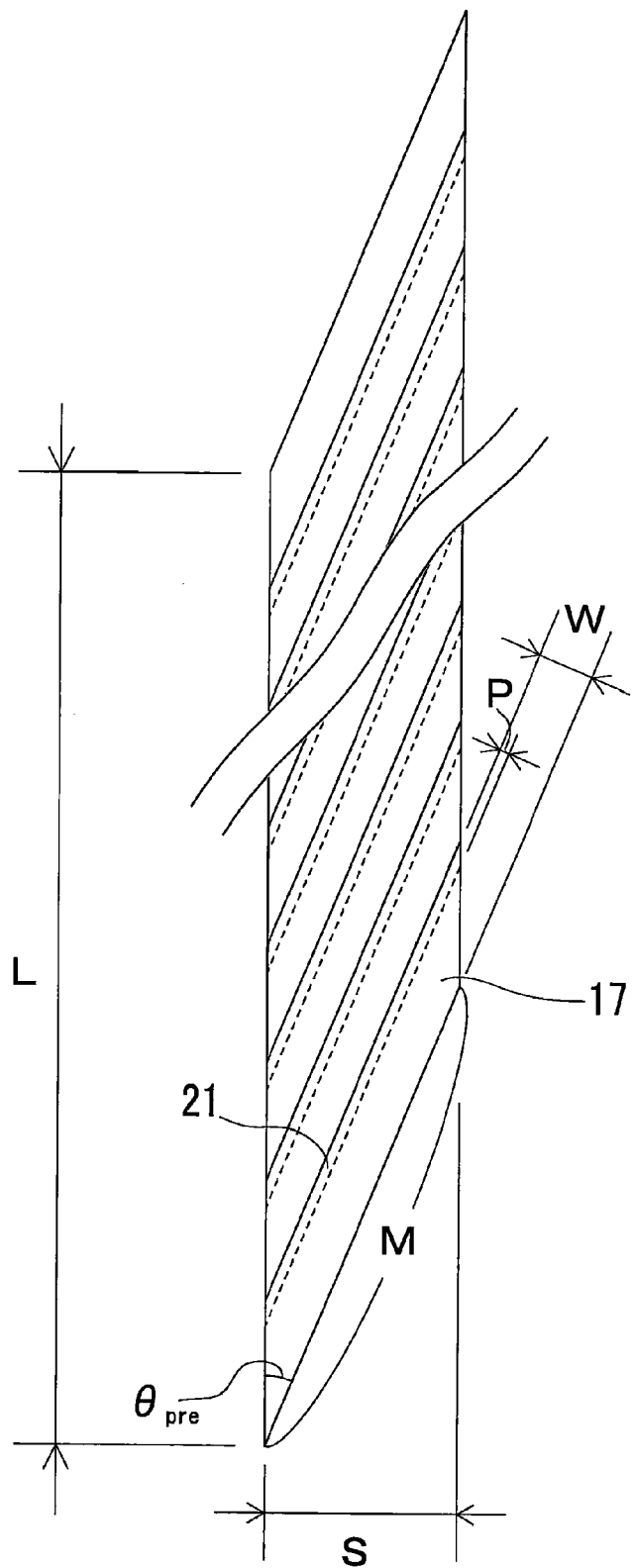
FIG. 3 A belt member produced through the belt member producing method according to the embodiment of the invention.

10 . . . belt member producing apparatus
12 . . . strip material
14 . . . strip roll
16 . . . regular-length feeding conveyor
17 . . . strip piece
18 . . . non-cut sides
19 . . . cut sides
20 . . . cutter
22 . . . transfer conveyor
32 . . . belt member

The invention claimed is:

1. A belt member producing method comprising forming a separated strip piece of a predetermined width W by cutting a strip material comprising a plurality of reinforcement cords, the strip material having been fed from a strip roll, to a regular size while the strip material is on a regular-length feeding conveyor, the regular-length feeding conveyor and the strip roll feeding the strip material being in the same central axial line, maintaining the separated strip piece after the cutting occurs on the regular-length feeding conveyor temporarily, then conveying the separated strip piece vertically to a transfer conveyor by a conveying device, so as to convey the separated strip piece from the regular-length feeding conveyor to the transfer conveyor, in the traveling direction of the regular-length feeding conveyor and the transfer conveyor, the transfer conveyor being arranged substantially parallel to the regular-length feeding conveyor, while rotating the separated strip piece through a predetermined angle in such a manner that cut sides of the separated strip piece are in parallel with a traveling direction of the transfer conveyor and overlapping continuously an integral number $N_{int}$ of separated strip pieces on each other on the transfer conveyor in such a manner that the separated strip pieces are overlapped on each other by an overlapping amount P along non-cut sides thereof, so as to produce a belt member having a desired length equal to a predetermined length L of a belt layer of a pneumatic radial tire, the belt member producing method further comprising determining the integral number $N_{int}$ and the overlapping amount P by the following steps of:

(1) selecting a desired cutting angle $\theta_{pre}$ relative to a traveling direction of the strip material when the strip material is cut to the regular size;

(2) calculating a number $N_{cal}$ of separated strip pieces necessary for forming a belt member by the following equation, $N_{cal}=(L/W)\times\sin \theta pre$ (3) rounding up the number Ncal of separated strip pieces so calculated to obtain an integral number $N_{int}$, and (4) calculating an overlapping amount P of the separated strip pieces by the following equation, $P=W-L \times\sin \theta pre /N_{int}$.

* * * * *

UNITED STATES PATENT AND TRADEMARK OFFICE
CERTIFICATE OF CORRECTION

PATENT NO. : 8,182,634 B2
APPLICATION NO. : 11/995262
DATED : May 22, 2012
INVENTOR(S) : Tetsuo Tatara et al.

It is certified that error appears in the above-identified patent and that said Letters Patent is hereby corrected as shown below:

Title page Item (57) (Abstract), Line 20, delete "$N_{int}$" and insert -- $N_{int}$, --.

Column 6, line 59 (Claim 1, line 34), delete "(L/W)×sin θpre" and insert -- (L/W)×sin $θ_{pre}$ --.

Column 6, line 60 (Claim 1, line 35), delete "Ncal" and insert -- $N_{cal}$ --.

Column 6, lines 63-64 (Claim 1, lines 38-39), delete "P=W-L ×sin θpre" and insert -- P=W-L×sin $θ_{pre}$ --.

Signed and Sealed this
Seventh Day of August, 2012

David J. Kappos
*Director of the United States Patent and Trademark Office*